Sept. 18, 1923.

E. I. PEARSON

VALVE

Filed Nov. 12, 1921

1,468,030

INVENTOR.
Edward I. Pearson,
By Owen Owen & Crampton,
Attys.

Patented Sept. 18, 1923.

1,468,030

UNITED STATES PATENT OFFICE.

EDWARD I. PEARSON, OF TOLEDO, OHIO.

VALVE.

Application filed November 12, 1921. Serial No. 514,445.

*To all whom it may concern:*

Be it known that I, EDWARD I. PEARSON, a citizen of the United States, and a resident of Toledo, Lucas County, Ohio, have made an Invention Appertaining to Valves; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates particularly to check valves, but may be used in connection with other valves where a close fluid tight joint is desired.

Considerable difficulty has been experienced in practice in providing a check valve in gasoline fluid lines which, when closed, will effectually seal the line against leakage of the fluid around the valve. The primary object of this invention is to provide a simple and inexpensive valve of this character which will effectually seal a fluid line against any back leakage around the valve when closed.

The invention is fully described in the following specification, and while, in its broader aspect, it is capable of embodiment in numerous forms, a preferred embodiment thereof is illustrated in the accompanying drawings, in which,—

Figure 1:
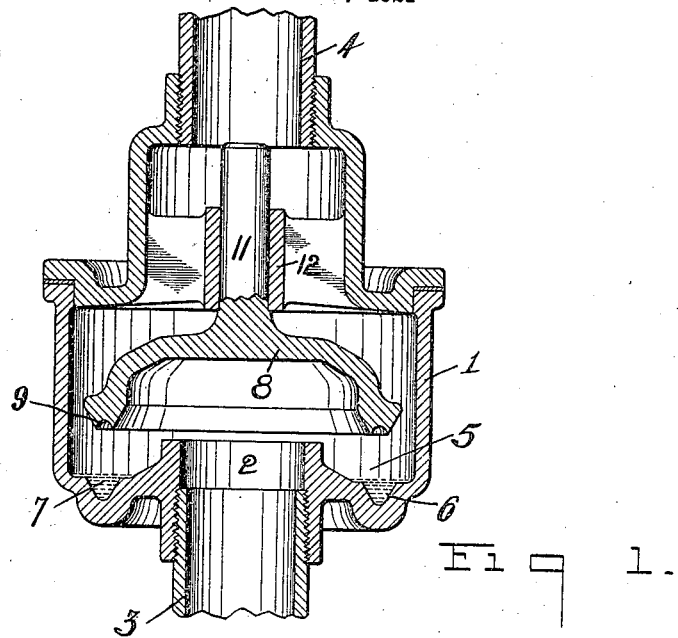
Figure 2:
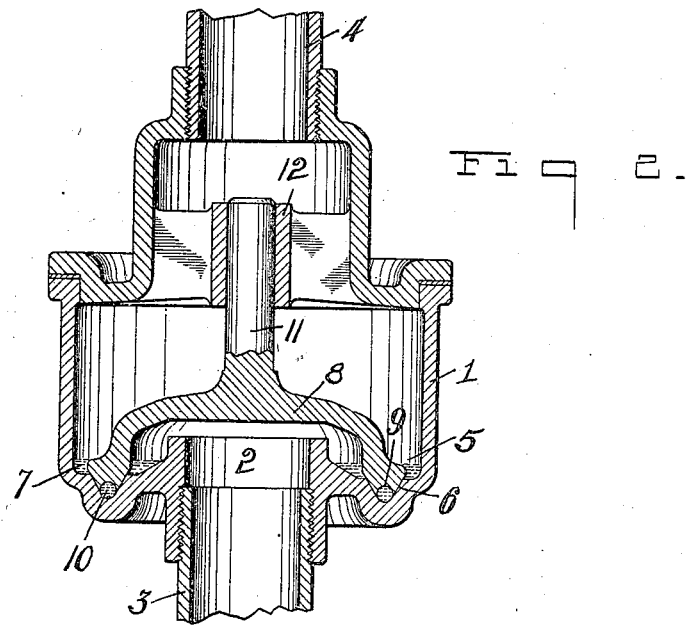

Fig. 1 is a central vertical longitudinal section of a portion of a fluid line with a valve embodying the invention disposed therein in similar section and in open position, with a part in full, and Fig. 2 is a view similar to Fig. 1 with the valve in closed position.

Referring to the drawings, 1 designates a valve casing having an opening 2 in its bottom with which a fluid line pipe 3 may be connected and having an opening in its top portion with which a fluid line pipe 4 may be connected. The bottom of the valve casing 1 is provided around the wall forming the opening 2 with a trough 5, in the present instance of annular form, and this trough is preferably provided in its bottom entirely around the opening 2 with a V-shaped valve seat 6. The trough 5 and valve seat 6 are intended to receive and hold a fluid line sealing agent 7 which is considerably heavier than the fluid passing through the line, and it is found in practice that mercury is admirably adapted for this purpose.

A check valve 8 of inverted cup form is mounted in the casing 1 for free reciprocatory movements therein and is adapted to seat at its lower edge in the V-shaped recess 6 of the casing, the edge of the valve being of complemental V-form for such purpose. The lower or apex edge of the valve is provided with a downwardly facing groove or recess 9 extending entirely around the valve edge and adapted when the valve is seated, to cooperate with the bottom or apex portion of the groove 6 to form a closed chamber in which a quantity of mercury or other sealing fluid 7 is trapped, as shown at 10 in Fig. 2. It is evident that as the edge of the valve lowers to seating position through the mercury 7 the valve groove 9 will fill with mercury and this, together with the mercury which is not displaced from the bottom of the recess 6 by the seating movement, will cooperate with the conical coacting surfaces of the valve and casing to effectually prevent leakage of any fluid around the valve when seated. The valve 8 in the present instance has a stem 11 rising therefrom and projecting up through a guide 12 in the upper part of the casing.

It is evident that while I have illustrated a particular form of valve and casing, the invention is not restricted to such form or to use in connection with a check type of valve, but is capable of numerous modifications and changes without departing from the spirit of the claims.

Having thus described my invention, what I claim as new, and desire to secure by Letters Patent, is,—

1. In a fluid line, a valve casing having inlet and outlet openings and having a recessed valve seat in its bottom between the two openings, a sealing fluid in the recess which fluid is heavier than the fluid passing through the line, and a valve disposed in the casing for seating in the recess of the valve seat and cooperating with the valve seat when seated therein to form a space which is filled with the sealing fluid.

2. In a fluid line, a valve casing having inlet and outlet openings, a valve seating recess in its bottom, mercury in said recess, and a valve movable in the casing to open and close the fluid line and having a portion complemental to the recess for seating therein and provided with a groove which cooperates with the recess to trap a portion of the mercury within the recess when the valve is seated.

3. In a fluid line, a valve casing having inlet and outlet openings, a valve seating recess of substantially V-form in the casing bottom, mercury in said recess, a valve movable in the casing to open and close the fluid line and having a V-shaped portion complemental to the recess for seating therein, the apex portion of the seating portion of the valve being provided with a downwardly opening groove to receive and trap a portion of the mercury within the base of the recess when the valve is seated.

4. In a fluid line, a valve casing having inlet and outlet openings with one of such openings in its bottom, the casing having a valve seating recess in its bottom around the bottom opening, mercury disposed in said recess, an inverted cup valve having its edge complemental to the recess for closely seating therein and cooperating with the recess to form a chamber which entirely surrounds the bottom opening and in which a portion of the mercury is trapped when the valve seats in the recess.

In testimony whereof I have hereunto subscribed my name to this specification.

EDWARD I. PEARSON.